United States Patent Office 3,440,102
Patented Apr. 22, 1969

3,440,102
METHOD OF OPERATING A FUEL CELL WITH AN INSOLUBLE FUEL
Eugene L. Holt, Forest Hills, N.Y., assignor to Esso Research and Engineering Company, a corporation of Delaware
No Drawing. Filed Dec. 27, 1963, Ser. No. 334,001
Int. Cl. H01m 27/22
U.S. Cl. 136—86      10 Claims

ABSTRACT OF THE DISCLOSURE

The operation of a fuel cell utilizing a liquid fuel insoluble in an electrolyte of either phosphoric acid, sulfuric acid, or perchloric acid is rendered more efficient by maintaining the electrolyte-fuel mixture at its boiling point during such operation.

---

This invention relates to a method of operating a fuel cell. In particular it relates to a method of operating a fuel cell employing an insoluble fuel. More particularly, the invention relates to a method of operating a fuel cell employing a fuel that is insoluble in the electrolyte at the boiling point of the fuel-electrolyte mixture.

Heretofore, one of the problems that has been facing the art has been a method of operating a fuel cell fueled with a fuel that is insoluble in the liquid electrolyte. A number of methods have been tried including decomposing the liquid fuel into components which would be soluble in the electrolyte or be gaseous for use in a gaseous fueled fuel cell. The problem has been enhanced in that to afford an efficient fuel cell, of necessity the fuel and the electrolyte must come in simultaneous contact with the electrode. This creates a problem when the fuel is a liquid which is immiscible with the electrolyte.

It has now been discovered that liquids which are insoluble in the electrolyte can be used as fuels in a fuel cell by mixing the fuel with the electrolyte and maintaining the electrolyte-fuel mixture at the boiling point of said mixture.

In the practice of this invention, the electrolyte to be used must be a high boiling conductive acid such as $H_2SO_4$, $H_3PO_4$, $HClO_4$. It is preferable to use as the electrolyte either sulfuric or phosphoric acid. The acids can be used in concentrations of from about 0.1 to 99 wt. percent, preferably 1 to 98 wt. percent and most preferably from about 10 to 96 wt. percent.

In the practice of this invention, fuel to be used must be a liquid when introduced into the fuel cell and be immiscible with the electrolyte. Such fuels would include $C_4$ to $C_{32}$ hydrocarbons, both saturated and unsaturated, and the higher alcohols, aldehydes, ketones and organic acids. Specific examples of the fuels that can be used would include decane, hexadecane, benzene, isoctane, pentane, hexane, butene, heptane, decene hexene, eicosane, tricontane and dodecyl alcohol, decyl alcohol, and 1-tridecanol. The hydrocarbons which would be solids at ordinary temperatures can be heated to form a liquid and then introduced to the fuel cell as a liquid. The fuels can be admitted to the electrolyte in the fuel cell by simply pumping them into the cell through a conduit or admitting them into the cell through a sparger so that the fuel forms small droplets as it enters the electrolyte.

The electrodes in the cell can be either horizontally or vertically orientated within the compartment adapted to oxidize the fuel to produce electricity. Any of the known electrodes which would be stable at the boiling point of the electrolyte-fuel mixture can be used in the practice of this invention with screen-type electrodes preferred. The screen-type electrodes can either be formed from catalytic metals such as platinum wire screens or can be an inert material with a catalyst pressed thereon, such as tantalum screens with platinum black or mixtures of Pt-Ir pressed thereon, or it could be a screen such as a metal coated tetrafluoroethylene screen with a platinum black or other catalyst pressed thereon.

In practice of this invention, the electrolyte in the fuel cell is brought to a temperature at or above the boiling point of the electrolyte and fuel mixture and the fuel is then added to the cell. The temperature of the cell is then maintained at the boiling point of the fuel-electrolyte mixture. The temperature may be maintained by applying an external heat source to the fuel cell, or constructing the cell so that only a small volume of electrolyte is used in the cell. In this latter case, the temperature can be maintained by the reaction taking place in the cell. A preferred method of maintaining the temperature is to insert a fine wire screen at the anode which is connected to a power source so that the screen will act as a resistance heater, thereby heating the fuel electrolyte mixture to the boiling point of the mixture at the anode. Alternatively, heating of the electrode surface may be accomplished by passing a radio-frequency current through the electrode. By using the latter two methods, it would not but only that small area at the face of the anode. In practicing this invention, the temperature of the electrolyefuel mixture at the anode must be maintained at the boiling point of the fuel-electrolyte mixture. Any decrease in temperature below this level results in severe polarization of the electrode. In a fuel cell the higher the polarization the more inefficient the cell.

The following examples are offered for the purpose of clearly defining the invention and are not to be construed as a limitation upon the scope of the invention as set forth in the appended claims.

Example 1

A fuel cell utilizing 30 wt. percent sulfuric acid as the electrolyte and decane as the fuel with an anode consisting of an 80 mesh platinum screen with platinum black thereon was tested in order to determine the efficiency of the instant process. The temperature of the cell was maintained by applying a heating mantle to the fuel cell. The cell was first run below the boiling point of the fuel-electrolyte mixture at a temperature of about 100° C. At this temperature a maximum current density of only about 6 ma./cm.$^2$ was able to be carried. The polarization of the electrode was .57 v. at 5 amps/cm.$^2$, rendering the electrode highly in efficient. The temperature of the cell was then raised to the boiling point of 106° C. The cell repidly improved to 0.20 v. polarization at 5 ma./cm.$^2$. A maximum current density of 50 ma./cm.$^2$ could be reached with this electrode as compared to only about 6 ma./cm.$^2$ when the temperature of the electrolyte-fuel mixture was below the boiling point. This experiment showed that the temperature of the electrolyte-fuel mixture must be maintaind at the boiling point of the electrolyte-fuel mixture.

Example 2

A fuel cell utilizing a platinum screen with platinum-iridium catalyst thereon situated horizontally in the anode compartment of a fuel cell was tested with this invention. The electrolyte was 50 wt. percent sulfuric acid. The fuel was decane admitted to the anolyte compartment through a spray nozzle (sparger) so that the decane formed droplets in the electrolyte. The temperature was maintained at about the boiling point of the electrolyte-fuel mixture. This system operated very efficiently over a current range up to 100 ma./cm.$^2$.

Example 3

To further test the instant method, a fuel cell utilizing a tantalum screen with platinum black thereon as the anode with a fine wire mesh resistance element placed in front of the anode, was with dodecance as the fuel and 94 wt. percent phosphoric acid as the electrolyte. The fuel was admitted to the electrolyte from a sparger and the resistance heater was used to bring the temperature of the electrolyte-fuel mixture at the surface of the anode up to the boiling point of the mixture. The cell was efficient over a wide current range. This experiment shows that the entire electrolyte-fuel mixture does not have to be heated, but only that part in contact with the anode.

Example 4

A fuel cell wherein the electrolyte compartment was divided into an anolyte and a catholyte chamber by means of a high-temperature thermal-stable membrane utilizing 30 wt. percent sulfuric acid as the electrolyte in both chambers, a platinum screen with platinum black thereon as the cathode, and a platinum screen with platinum black thereon as the anode, was tested to determine the efficiency of the instant process. The fuel used was decane and the oxidant was air. The heating element comprising a fine wire mesh screen was placed in close proximity to the anode. The heating element was connected to a variable power output so that the temperature output of the heating element could be varied. The element was heated so that the electrolyte-fuel mixture at the anode surface was raised to the boiling point of the mixture. The cell was operated to about 40 ma./cm.$^2$ of current density with a very low polarization. The temperature was then gradually decreased until the temperature of the electrolyte-fuel mixture at the electrode dropped below the boiling point of the mixture. Almost instantly a deterioration in performance was noted. The sharpness of the deterioration at the boiling point indicates that the increased activity is not simply due to the increased activation that would be expected from the higher temperature.

Example 5

A half cell was constructed utilizing 30 wt. percent sulfuric acid as the electrolyte, a tantalum screen with a mixture of Pt-Re as the catalyst thereon as the anode which was vertically orientated in the cell. The cell was heated with a heating mantle and the fuel, decyl alcohol, was admitted at the bottom of the cell through a conduit. The cell was operated at the boiling point of the fuel-electrolyte mixture. The cell performed well over a substantial current range.

Example 6

A fuel cell wherein the electrolyte compartment was divided into an anolyte chamber and a catholyte chamber by means of a high-temperature stable membrane utilizing 85 wt. percent $H_3PO_4$ as the electrolyte in both chambers, a tantalum screen with a Pt-Ir catalyst thereon as the anode and a platinum screen with platinum black thereon as the cathode, was tested. The fuel was decane and the oxidant was oxygen. A heating element, a fine mesh wire screen, was placed in close proximity to the anode and was connected to a variable power output so that the temperature could be varied. The fuel was admitted through a sparger. The cell was operated at about 50 ma./cm.$^2$ of current density with a low polarization. The temperature was then gradually decreased until the temperature of the electrolyte-fuel mixture at the electrode dropped below the boiling point of the electrolyte-fuel mixture. Almost instantly a deterioration in performance was noted. This experiment indicates that only the electrolyte-fuel mixture at the electrode need be heated and that for efficient performance the temperature of the electrolyte-fuel mixture must be kept at the boiling point of the mixture.

What is claimed is:

1. A method of operating a fuel cell utilizing a liquid organic fuel and a liquid electrolyte which comprises introducing a liquid organic fuel into the electrolyte which is insoluble in the electrolyte and maintaining the temperature of the fuel-electrolyte mixture at the boiling point of the mixture, said electrolyte being selected from the group consisting of phosphoric acid, sulfuric acid and perchloric acid.

2. A method as in claim 1 wherein the electrolyte-fuel mixture at the anode is maintained at the boiling point.

3. A method as in claim 1 wherein the fuel is a $C_4$ to $C_{32}$ hydrocarbon.

4. A method as in claim 1 wherein the fuel is a $C_8$ to $C_{20}$ alcohol.

5. A method of operating a fuel cell utilizing a liquid organic fuel and a liquid electrolyte which comprises spraying said fuel into the electrolyte, said liquid organic fuel being insoluble in the electrolyte, maintaining the temperature of the electrolyte-fuel mixture at the boiling point, said electrolyte being selected from the group consisting of phosphoric acid, sulfuric acid and perchloric acid.

6. A method as in claim 5 wherein the electrolyte-fuel mixture at the surface of the anode is maintained at its boiling point.

7. A method as in claim 5 wherein the fuel is a $C_4$ to $C_{32}$ hydrocarbon.

8. A method as in claim 5 wherein the fuel is a $C_8$ to $C_{20}$ alcohol.

9. A method as in claim 5 wherein the fuel is decane.

10. A method as in claim 5 wherein the fuel is decyl alcohol.

References Cited

UNITED STATES PATENTS

| | | | |
|---|---|---|---|
| 2,925,454 | 2/1960 | Justi et al. | 136—86 |
| 3,113,049 | 12/1963 | Worsham | 136—86 |
| 3,188,241 | 6/1965 | Weiss et al. | 136—86 |
| 3,202,546 | 8/1965 | Rightmire et al. | 136—86 |

WINSTON A. DOUGLAS, *Primary Examiner.*

H. FEELEY, *Assistant Examiner.*